United States Patent
Howe et al.

(10) Patent No.: US 9,631,554 B2
(45) Date of Patent: Apr. 25, 2017

(54) ELECTROSTATIC CHARGE CONTROL INLET PARTICLE SEPARATOR SYSTEM

(71) Applicant: HONEYWELL INTERNATIONAL INC., Morristown, NJ (US)

(72) Inventors: Jeff Howe, Chandler, AZ (US); Harry Lester Kington, Scottsdale, AZ (US); Nick Nolcheff, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 604 days.

(21) Appl. No.: 14/154,428

(22) Filed: Jan. 14, 2014

(65) Prior Publication Data

US 2015/0198090 A1    Jul. 16, 2015

(51) Int. Cl.
 *F02C 7/052*    (2006.01)
 *B03C 3/41*    (2006.01)
 (Continued)

(52) U.S. Cl.
 CPC ............ *F02C 7/052* (2013.01); *B03C 3/08* (2013.01); *B03C 3/12* (2013.01); *B03C 3/361* (2013.01);
 (Continued)

(58) Field of Classification Search
 CPC .......... F02C 7/05; F02C 7/052; F02C 7/0545; F02C 9/18; F02C 7/054; F05D 2260/607; B64D 2033/0246; F23R 3/02; F23R 3/04; F23R 3/16; B03C 3/12; B03C 3/08; B03C 3/361; B03C 3/41
 See application file for complete search history.

(56) References Cited

U.S. PATENT DOCUMENTS 2,992,177 A    7/1961    Morrisson
3,436,910 A    4/1969    Haworth
(Continued)

FOREIGN PATENT DOCUMENTS

CN    1952378 A    4/2007
RU    1816047 A    7/1990

OTHER PUBLICATIONS

Uses of electrostatics, Jun. 1, 2012, Science, p. 1, See "Jun. 1, 2012" link on p. 2.*

(Continued)

*Primary Examiner* — Phutthiwat Wongwian
*Assistant Examiner* — Marc Amar
(74) *Attorney, Agent, or Firm* — Lorenz & Kopf, LLP

(57) ABSTRACT

An inlet particle separator system for an engine includes an inner flowpath section, an outer flowpath section, a splitter, a first electrostatic discharge device, and a second electrostatic discharge device. The outer flowpath section surrounds at least a portion of the inner flowpath section and is spaced apart therefrom to define a passageway having an air inlet. The splitter is disposed downstream of the air inlet and extends into the passageway to divide the passageway into a scavenge flow path and an engine flow path. The first electrostatic charge device is disposed between the air inlet and the splitter and is electrostatically charged to a first polarity. The second electrostatic charge device is disposed downstream of the first electrostatic charge device and is electrostatically charged to a second polarity that is opposite to the first polarity.

13 Claims, 4 Drawing Sheets

(51) Int. Cl.
  *F23R 3/04* (2006.01)
  *B03C 3/08* (2006.01)
  *B03C 3/12* (2006.01)
  *B03C 3/36* (2006.01)
  *B64D 33/02* (2006.01)

(52) U.S. Cl.
  CPC .................. *B03C 3/41* (2013.01); *F23R 3/04* (2013.01); *B03C 2201/10* (2013.01); *B64D 2033/0246* (2013.01); *F05D 2260/607* (2013.01); *Y02T 50/675* (2013.01)

(56) References Cited

U.S. PATENT DOCUMENTS

| | | | | |
|---|---|---|---|---|
| 4,389,227 | A | * | 6/1983 | Hobbs ..................... F02C 7/052 244/53 B |
| 4,493,185 | A | * | 1/1985 | Hobbs ..................... F02C 7/052 55/306 |
| 4,543,484 | A | * | 9/1985 | Meyerand, Jr. ......... F01D 25/32 250/423 P |
| 4,860,534 | A | | 8/1989 | Easley et al. |
| 4,876,852 | A | * | 10/1989 | Abthoff ................ B03C 3/0175 55/DIG. 30 |
| 4,888,948 | A | | 12/1989 | Fisher et al. |
| 4,928,480 | A | * | 5/1990 | Oliver .................... B64D 33/02 55/306 |
| 5,039,317 | A | | 8/1991 | Thompson et al. |
| 5,279,109 | A | | 1/1994 | Liu et al. |
| 5,925,170 | A | * | 7/1999 | Nojima ..................... B03C 3/40 96/100 |
| 6,254,341 | B1 | | 7/2001 | Ackerman et al. |
| 6,464,455 | B2 | | 10/2002 | Wilson |
| 6,527,829 | B1 | * | 3/2003 | Malkamaki ............. B03C 3/017 55/DIG. 38 |
| 6,698,180 | B2 | * | 3/2004 | Snyder .................... B01D 45/08 137/15.1 |
| 6,886,345 | B2 | | 5/2005 | Ritland |
| 7,581,397 | B2 | | 9/2009 | Strangman et al. |
| 7,608,122 | B2 | * | 10/2009 | Snyder .................... F02C 7/052 55/306 |
| 7,625,435 | B2 | | 12/2009 | Dooley |
| 7,870,719 | B2 | * | 1/2011 | Lee ......................... F01D 5/143 313/362.1 |
| 8,539,775 | B1 | * | 9/2013 | Wong ....................... F02C 7/30 60/39.092 |
| 2005/0034464 | A1 | | 2/2005 | Gonzalez |
| 2007/0095033 | A1 | * | 5/2007 | Snyder .................... B01D 45/06 55/440 |
| 2009/0266048 | A1 | | 10/2009 | Schwarz |
| 2009/0293485 | A1 | * | 12/2009 | Nolcheff ................... F01D 9/02 60/751 |
| 2010/0122536 | A1 | * | 5/2010 | Nolcheff ............... F23C 99/001 60/751 |
| 2010/0162682 | A1 | | 7/2010 | Lerg |
| 2015/0174587 | A1 | * | 6/2015 | Wei .......................... B03C 3/12 422/186.04 |

OTHER PUBLICATIONS

Oliver, W.R. et al.; Innovative Engine Inlet Protection Systems; USAATCOM TR96-D-36, U.S. Army Aviation and Troop Command, Apr. 1996.

* cited by examiner

ELECTROSTATIC CHARGE CONTROL INLET PARTICLE SEPARATOR SYSTEM

TECHNICAL FIELD

The present invention generally relates to an inlet particle separator system for a vehicle engine, and more particularly relates to an inlet particle separator system that includes electrostatic charge control devices to improve fine particulate separation efficiency.

BACKGROUND

During operation of a vehicle, air is induced into an engine and, when mixed with a combustible fuel, is used to generate energy to propel the vehicle. The induced air may contain undesirable particles, such as sand and dust, which can degrade engine components. In order to prevent or at least minimize such degradation, many aeronautical vehicles use an inlet particle separator system, disposed upstream of the engine, to remove at least a portion of the undesirable particles.

A conventional inertial inlet particle separator typically includes an inlet duct system having a fluid passageway that transitions into a scavenge flow path and an engine flow path. Air that is induced into the fluid passageway may have particles suspended therein. The inertia of relatively larger ones of the suspended particles tends to cause these particles to travel in a straight line rather than follow the fluid passageway. Because of the manner in which the inlet particle separator is configured, most of the suspended heavier particles tend to flow into the scavenge flow path rather than curve into the engine flow path. As such, air that is relatively clean of large particles is directed into the engine, and contaminated air, which has the particles suspended therein, is directed through the scavenge flow path and is discharged.

Conventional inlet particle separators, such as those described above, operate at relatively high separation efficiencies (separation efficiency is defined as percentage of the inlet dust collected) for relatively large particles (e.g., >80 microns). However, for relatively small particles (e.g., <80 microns), the efficiencies can be relatively low, resulting in a significant amount of these relatively small particles being ingested into the engine compressor. These relatively small particles, while being potentially less troublesome from an erosion perspective than the relatively large particles, can still have deleterious effects. For example, these particles can plug secondary flow lines and/or can melt and form glass on relatively hot engine components, such as the combustor, which can significantly reduce engine performance or have other undesirable effects.

One method that has been postulated to increase the separation efficiency of relatively small particles is to increase the steepness of the fluid passageway upstream of the transition to the scavenge flow and engine flow paths. This method is undesirable because it results in boundary layer separation of the air flow downstream of the transition, which increases pressure losses and reduces engine performance.

Hence, there is a need for an inlet particle separator system that increases the separation efficiency of relatively small particles from engine inlet air without increasing pressure loss in the particulate separation region. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an inlet particle separator system for an engine includes an inner flowpath section, an outer flowpath section, a splitter, a first electrostatic discharge device, and a second electrostatic discharge device. The outer flowpath section surrounds at least a portion of the inner flowpath section and is spaced apart therefrom to define a passageway having an air inlet. The splitter is disposed downstream of the air inlet and extends into the passageway to divide the passageway into a scavenge flow path and an engine flow path. The first electrostatic charge device is disposed between the air inlet and the splitter. The first electrostatic charge device is electrostatically charged to a first polarity to thereby impart an electrostatic charge of a first polarity to at least a portion of particulate entering the air inlet. The second electrostatic charge device is disposed downstream of the first electrostatic charge device and is electrostatically charged to a second polarity that is opposite to the first polarity, whereby particulate charged to the first polarity is attracted toward the second polarity.

In another embodiment, a gas turbine engine includes a compressor section having an air inlet, a combustion section, and turbine section disposed in flow series. The engine also includes an inlet particle separator system that is coupled to, and disposed upstream of, the compressor section. The inlet particle separator system includes an inner flowpath section, an outer flowpath section, a splitter, a first electrostatic discharge device, and a second electrostatic discharge device. The outer flowpath section surrounds at least a portion of the inner flowpath section and is spaced apart therefrom to define a passageway having an air inlet. The splitter is disposed downstream of the air inlet and extends into the passageway to divide the passageway into a scavenge flow path and an engine flow path. The first electrostatic charge device is disposed between the air inlet and the splitter. The first electrostatic charge device is electrostatically charged to a first polarity to thereby impart an electrostatic charge of a first polarity to at least a portion of particulate entering the air inlet. The second electrostatic charge device is disposed downstream of the first electrostatic charge device and is electrostatically charged to a second polarity that is opposite to the first polarity, whereby particulate charged to the first polarity is attracted toward the second polarity.

In yet another embodiment, an inlet particle separator system for an engine includes an inner flowpath section having an outer diameter that gradually increases to a point of maximum diameter. The outer flowpath section surrounds at least a portion of the inner flowpath section and is spaced apart therefrom to define a passageway. The inner flowpath section and the outer flowpath section are configured to define a throat section at the point of maximum diameter. The splitter is disposed downstream of the air inlet and extends into the passageway to divide the passageway into a scavenge flow path and an engine flow path. The secondary flow passage has a secondary flow passage inlet port and a secondary flow passage outlet port. The secondary flow passage inlet port extends through the inner flowpath section and is in fluid communication with the air inlet. The secondary flow passage inlet is disposed downstream of the air inlet and upstream of the throat section. The secondary flow passage outlet port extends through the splitter and in fluid communication with the scavenge flow path. The first electrostatic charge device is disposed between the air inlet and the splitter. The first electrostatic charge device is electrostatically charged to a first polarity to thereby impart an electrostatic charge of a first polarity to at least a portion of particulate entering the air inlet. The second electrostatic charge device is disposed within the secondary flow passage downstream of the first electrostatic charge device and is electrostatically charged to a second polarity that is opposite to the first polarity, whereby particulate charged to the first polarity is attracted toward the second polarity. The inner flowpath section and the outer flowpath section are configured such that the passageway downstream of the throat defines a separation section that includes the scavenge flow section and the engine flow path. The splitter extends into the separation section.

Furthermore, other desirable features and characteristics of the inlet particle separator system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
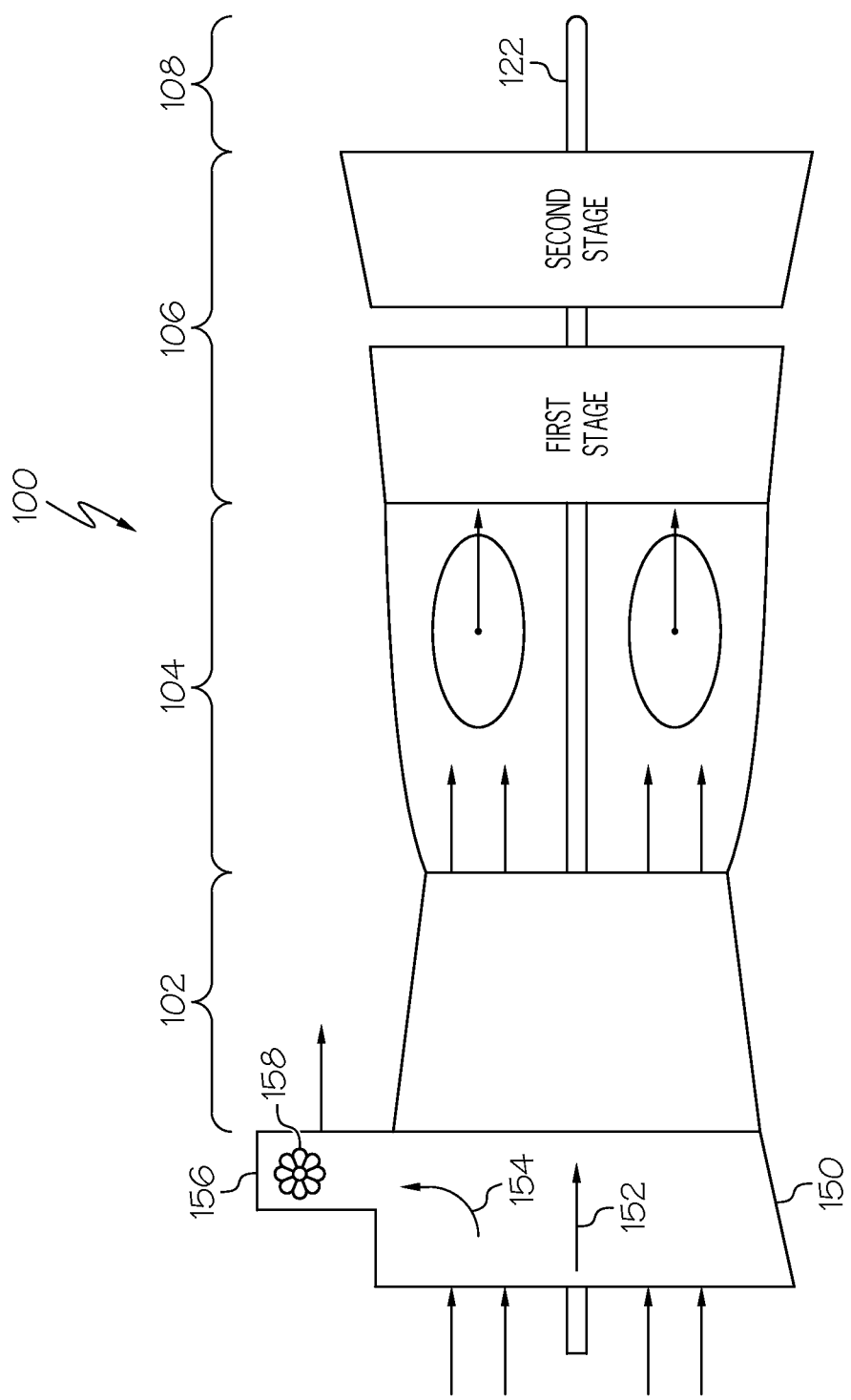
FIG. 1 is a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors, draws air into the engine 100 and compresses the air to raise its pressure.

No matter the particular number of compressors that are included in the compressor section 102, the compressed air is directed into the combustion section 104. In the combustion section 104, which includes a combustor assembly, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a first stage and a second stage. However, it will be appreciated that the engine 100 could be configured with more or less than this number of turbines. No matter the particular number, the combusted air mixture from the combustion section 104 expands through each turbine stage, causing it to rotate a power shaft 122. The combusted air mixture is then exhausted via the exhaust section 108. The power shaft 122 may be used to drive various devices within the engine or vehicle. For example, in the context of a helicopter, the power shaft may be used to drive one or more rotors.

As FIG. 1 further depicts, the gas turbine engine 100 also includes an inlet particle separator system 150. The inlet particle separator system 150 is coupled to, and disposed upstream of, the compressor section 102. The air that the compressor section 102 draws into the engine 100 first enters the inlet particle separator system 150. The inlet particle separator system 150, as will be described in more detail further below, is configured to separate the air that is drawn into the engine 100 into compressor inlet air 152 and scavenge air 154. The compressor inlet air 152 is drawn into the compressor section 102, and the scavenge air 154 is drawn into, for example, a scavenge scroll 156 via, for example, an air pump 158 (e.g., a blower or the like), and is then discharged into the atmosphere. The particle separator system 150 is additionally configured such that at least a portion of any particulates that are suspended in the air that is drawn into the engine 100 is separated therefrom and is discharged with the scavenge air 154. Thus, the compressor inlet air 152 that is drawn into the compressor section 102 is relatively clean, heavy particulate free air.

Figure 2:
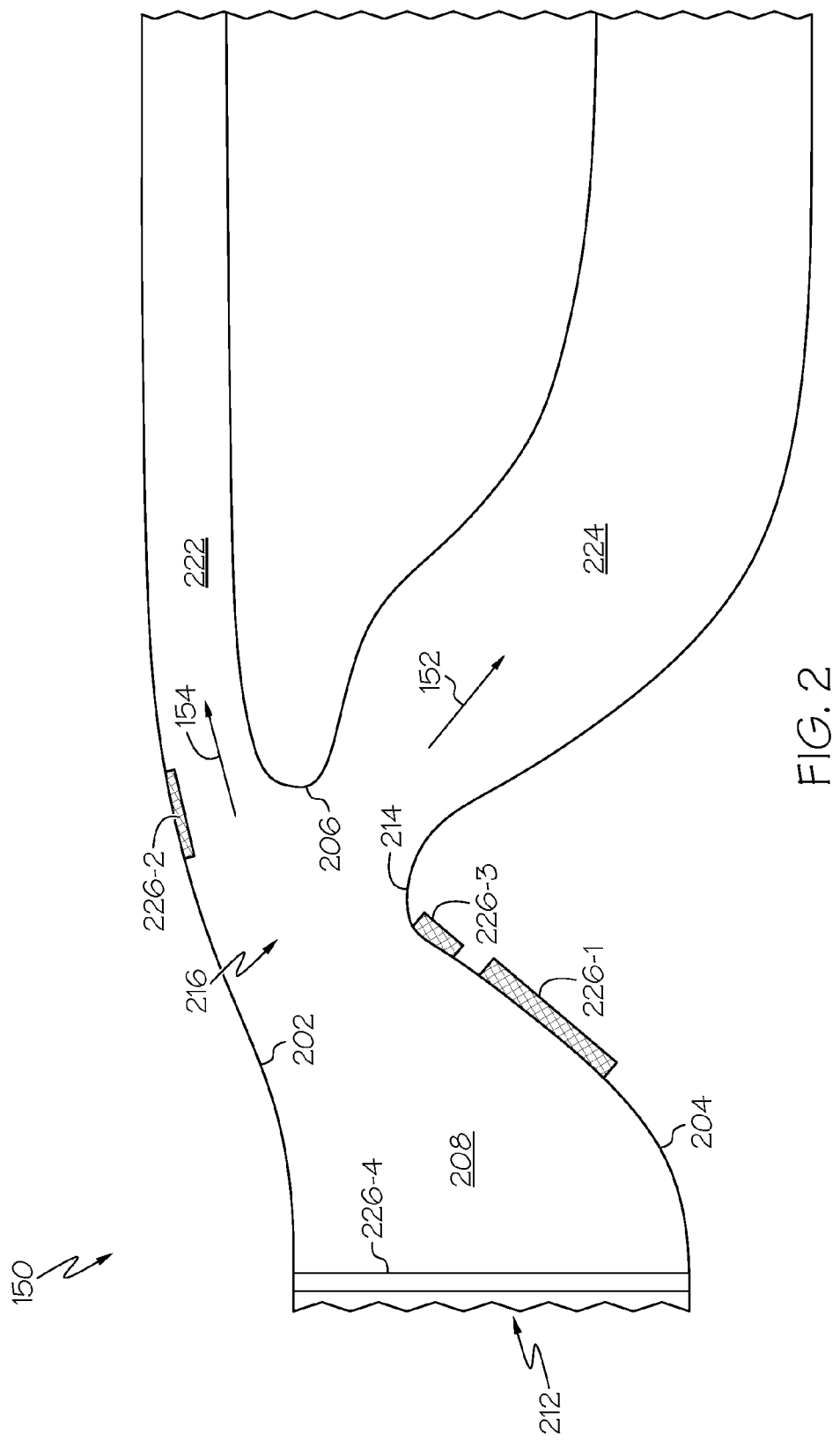
FIG. 2 is a partial cross section view of one embodiment of an inlet particle separator system that may be implemented in the gas turbine engine of FIG. 1.

Referring now to FIG. 2, a cross section view of portions of the inlet particle separator system 150 is depicted and will be described. The inlet particle separator system 150 includes an outer flowpath section 202, an inner flowpath section 204, and a splitter 206. The outer flowpath section 202 surrounds at least a portion of the inner flowpath section 204 and is spaced apart therefrom to define a passageway 208 having an air inlet 212. The air inlet 212 is configured to receive the air that is drawn into the engine 100. The outer flowpath section 202 and inner flowpath section 204 may be variously configured, but in the depicted embodiment the outer diameter of the inner flowpath section 204 gradually increases downstream of the air inlet 212 to a point of maximum diameter 214, and then decreases downstream of this point 214. The outer flowpath section 202 and inner flowpath section 204 are configured such that the flow passageway downstream of the point of maximum diameter defines what is referred to herein as the separation section 216.

The separation section 216 is where the air that is drawn into the engine 100, and more specifically the air that is drawn into the air inlet 212, is separated into the compressor inlet air 152 and the scavenge air 154. The separation section 216 is also where the splitter 206 is disposed. In particular, the splitter 206 extends into the passageway 208 downstream of the air inlet 212, and more specifically downstream of the point of maximum diameter 214, and divides the passageway 208 into a scavenge flow path 222, into which the scavenge air 154 flows, and an engine flow path 224, into which the compressor inlet air 152 flows.

As is generally known, air that is drawn into the engine 100 may have particles entrained therein. Due to their inertia, relatively larger (e.g., >80 microns) entrained particles will tend to collect adjacent the outer flowpath section 202, and will thus flow with the scavenge air 154 into the scavenge flow path 222. As previously noted, the scavenge air 154 is drawn into the scavenge scroll 156 via the pump 158 and is then eventually discharged into the atmosphere. The compressor inlet air 152, which has relatively few large particles entrained therein, flows into the engine flow path 224, and ultimately into the compressor section 102 (not depicted in FIG. 2).

It was noted above that, at least in some instances, relatively small entrained particles (e.g., <80 microns) can flow with the compressor inlet air 152 into the engine flow path 224, and thus be ingested into the compressor section 102. To prevent, or at least inhibit, a large portion of the relatively small particles from flowing into the compressor section 102, the depicted inlet particle separator system 150 includes a plurality of electrostatic charge devices 226. In the embodiment depicted in FIG. 2, the inlet particle separator system 150 includes four electrostatic charge devices 226 (e.g., 226-1, 226-2, 226-3, 226-4). It will be appreciated, however, that in some embodiments the inlet particle separator system 150 could include more or less than this number of electrostatic charge devices 226.

In the embodiment depicted in FIG. 2, the inlet particle separator system 150 includes at least a first electrostatic charge device 226-1, a second electrostatic charge device 226-2, and a third electrostatic charge device 226-3. The first and third electrostatic charge devices 226-1, 226-3 are each disposed between the air inlet 212 and the splitter 206, and are each electrostatically charged to a first polarity (e.g., a negative polarity). The first electrostatic device 226-1 is disposed upstream of the third electrostatic device 26-3. As a result, the first electrostatic charge device 226-1 imparts an electrostatic charge of the first polarity to at least a portion of the particulate entering the air inlet 212. The third electrostatic charge device 226-3 then repels the charged particulate toward the outer flowpath section 202. It will be appreciated that some embodiments do not include the third electrostatic charge device 226-3.

The second electrostatic charge device 226-2 is disposed downstream of the first and third electrostatic charge devices 226-1, 226-3 and is electrostatically charged to a second polarity (e.g., a positive polarity) that is opposite to the first polarity. Thus, the particulate that is charged to the first polarity by the first electrostatic charge device 226-1 and repelled by the third electrostatic charge device 226-3, is attracted toward the second electrostatic charge device 226-2. In some embodiments, the second electrostatic charge device 226-2 may be configured to pulse its charge. This facilitates the scavenge air 154 carrying away the attracted particulate, so that the particulate does not accumulate.

Figure 3:
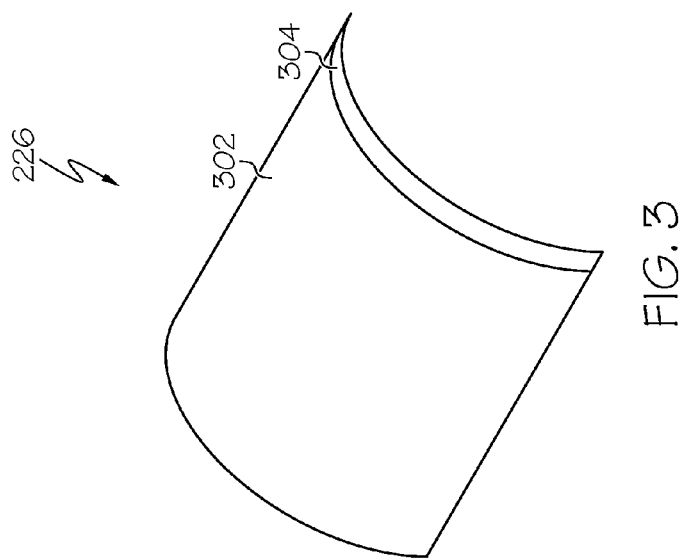

It will be appreciated that the first, second, and third electrostatic charge devices 226-1, 226-2, 226-3 may be variously configured and implemented. For example, and as depicted more clearly in FIG. 3, the first, second, and third electrostatic charge devices 226-1, 226-2, 226-3 may each be implemented as an electrically conductive plate 302 that is electrostatically charged to the appropriate polarity. The plate 302 may conform to the flowpath, and have an insulation layer 304 between the plate and the metal to which it is attached. Alternatively, the plate 302 could be implemented as an insulated material with relatively sharp electrodes embedded throughout the plate 302, and pointing radially outward.

Figure 5:
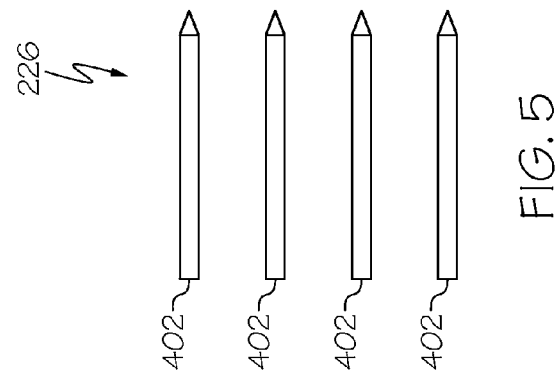
FIGS. 3-5 depict simplified schematic representations of different configurations of electrostatic charge devices that may be implemented in the inlet particle separation system of FIG. 2.
Figure 4:
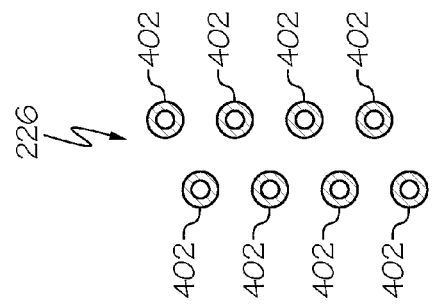

In other embodiments, such as the ones depicted more clearly in FIGS. 4 and 5, the first, second, and third electrostatic charge devices 226-1, 226-2, 226-3 may be implemented using a plurality of conductors 402 that are each electrostatically charged to the appropriate polarity. In the embodiment depicted in FIG. 4, the conductors 402 are configured as an array of electrostatically charged conductive wire tips disposed flush with the inner surface of the inner flowpath section 204. In the embodiment depicted in FIG. 5, the conductors 402 are configured as electrostatically charged conductive strips with tips, which are also disposed flush with the inner surface of the inner flowpath section 204.

Returning now to FIG. 2, it may be seen that the depicted inlet particle separator system 150 may also, at least in some embodiments, include another electrostatic charge device 226-4. This other electrostatic charge device 226-4 may be used in addition to, or instead of, the first electrostatic charge device 226-1. This electrostatic charge device 226-4, if included, is preferably implemented as a screen grid that comprises a plurality of conductors electrostatically charged to the first polarity. Moreover, it is preferably disposed adjacent to, and extends at least partially across, the air inlet 212.

Figure 6:
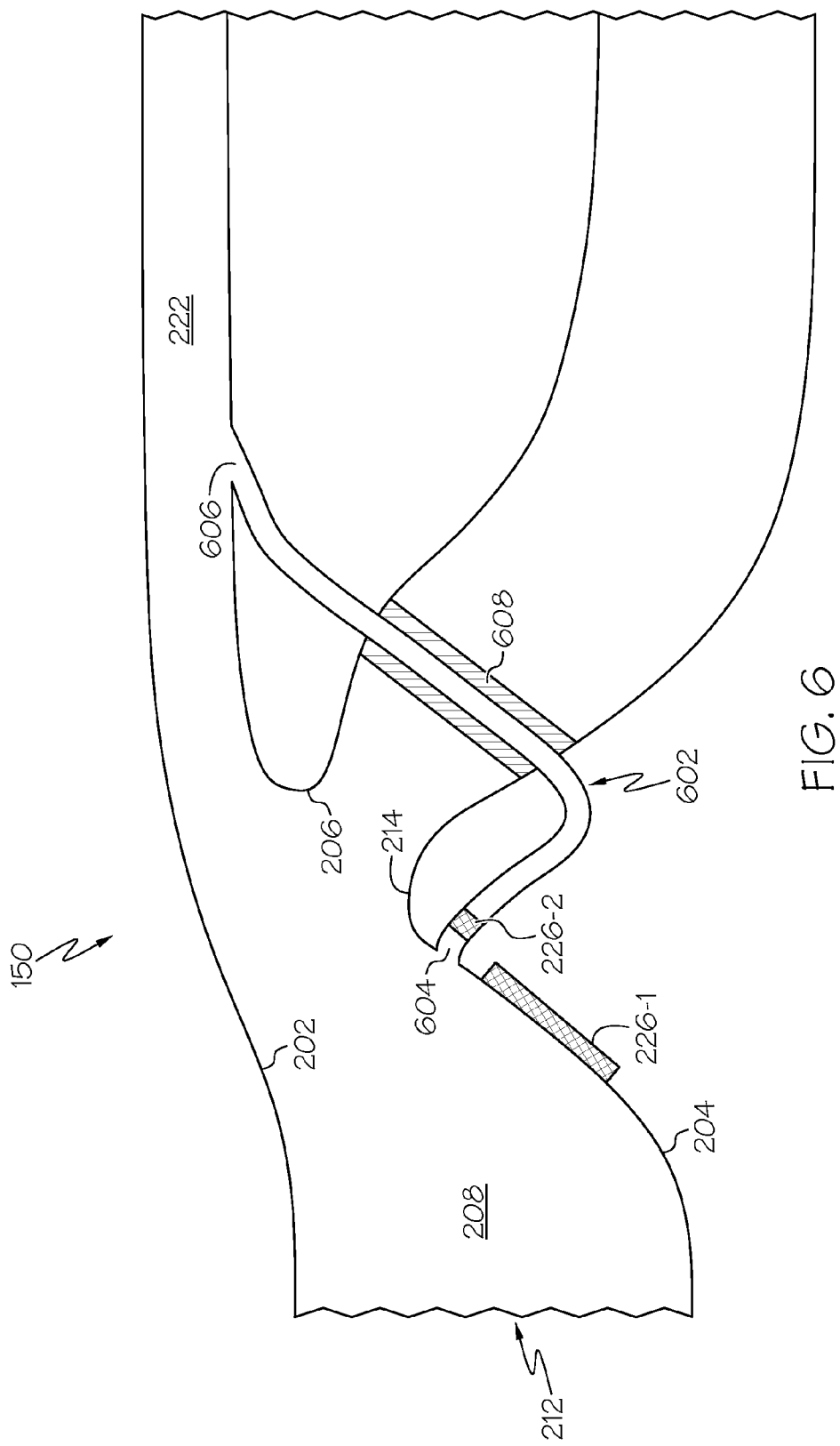
FIG. 6 is a simplified cross section view of a portion of another embodiment of an inlet particle separator system.

Not only may the second electrostatic charge device 226-2 be variously configured and implemented, but it may also be variously disposed. For example, in the embodiment depicted in FIG. 2, the second electrostatic charge device 226-2 is coupled to the outer flowpath section 202 upstream of the scavenge flow path 222. In an alternative embodiment, such as the one depicted in FIG. 6, the second electrostatic charge device 226-2 is disposed in secondary flow passage 602. This alternative embodiment will now be briefly described.

The secondary flow passage 602 includes secondary flow passage inlet port 604 and secondary flow passage outlet port 606. The secondary flow passage inlet port 604 extends through the inner flowpath section 204 and is in fluid communication with the air inlet 212. Though it may be variously disposed, the depicted secondary flow passage inlet port 602 is disposed downstream of the air inlet 212 and upstream of the throat section 214. The secondary flow passage outlet port 606 extends through the splitter 206 and is in fluid communication with the scavenge flow path 222. It will be appreciated that the air pump 158 is additionally configured to draw air into and through the secondary flow passage 226.

It should be noted that the secondary flow passage 602 is depicted as traversing the engine flow path 224 before extending through the splitter 206. This is made possible, in most embodiments, via one or more support struts 608 that are used to support the inner flowpath section 204 and the splitter 206. The secondary flow passage 602 is preferably formed in and extends through, one or more of these struts 608. It should additionally be noted that the secondary flow passage 602 may be implemented as a series of ducts distributed peripherally around the inner flow path or as a continuous slot.

The inlet particle separator system 100 described herein increases the separation efficiency of relatively small particles from engine inlet air without increasing (or at least significantly impacting) core pressure loss. In particular, the first electrostatic charge device(s) 226-1 and/or 226-4 imparts an electrostatic charge of the first polarity to at least the particles flowing in the vicinity of the device(s) 226-1 and/or 226-4. It should be noted that the particles may have accumulated a negative electrostatic charge as a natural result of flowing through the inlet ducting. Thus, the first polarity is preferably a negative polarity. The second electrostatic charge device 226-2, because it is electrostatically charged to a second, opposite polarity (e.g., a positive polarity), will tend to attract the charged finer particles and direct these particles into the scavenge flow path 222.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An inlet particle separator system for an engine, comprising:
    an inner flowpath section;
    an outer flowpath section surrounding at least a portion of the inner flowpath section and spaced apart therefrom to define a passageway, the passageway having an air inlet;
    a splitter disposed downstream of the air inlet and extending into the passageway to divide the passageway into a scavenge flow path and an engine flow path;
    a first electrostatic charge device disposed between the air inlet and the splitter and coupled to the inner flow path section, the first electrostatic charge device electrostatically charged to a first polarity to thereby impart an electrostatic charge of a first polarity to at least a portion of particulate entering the air inlet;
    a second electrostatic charge device disposed downstream of the first electrostatic charge device and coupled to the outer flowpath section upstream of the scavenge flow path, the second electrostatic charge device electrostatically charged to a second polarity that is opposite to the first polarity, whereby particulate charged to the first polarity is attracted toward the second polarity;
    a third electrostatic charge device disposed between the air inlet and the splitter and coupled to the inner flow path section, the third electrostatic device disposed downstream of, and separate from, the first electrostatic charge device and disposed upstream of, and separate from, the second electrostatic device, the third electrostatic charge device electrostatically charged to the first polarity to thereby repel particulate charged to the first polarity; and
    wherein there is no overlap between the second electrostatic charge device and the third electrostatic charge device along an axial direction with respect to a longitudinal axis of the engine flow path.

2. The system of claim 1, wherein the first electrostatic charge device comprises a screen grid disposed adjacent to, and extending at least partially across, the air inlet, the screen grid comprising a plurality of conductors electrostatically charged to the first polarity.

3. The system of claim 1, wherein the first electrostatic charge device comprises a plurality of conductors electrostatically charged to the first polarity.

4. The system of claim 1, wherein the first electrostatic charge device comprises an electrically conductive plate electrostatically charged to the first polarity.

5. The system of claim 1, wherein the second electrostatic charge device comprises a plurality of conductors electrostatically charged to the second polarity.

6. The system of claim 1, wherein the second electrostatic charge device comprises an electrically conductive plate electrostatically charged to the second polarity.

7. A gas turbine engine, comprising:
    a compressor section, a combustion section, and turbine section disposed in flow series, the compressor section having a compressor air inlet; and
    an inlet particle separator system coupled to, and disposed upstream of, the compressor section, the inlet particle separator system, comprising:
        an inner flowpath section;
        an outer flowpath section surrounding at least a portion of the inner flowpath section and spaced apart therefrom to define a passageway, the passageway having a passageway air inlet;
        a splitter disposed downstream of the passageway air inlet and extending into the passageway to divide the passageway into a scavenge flow path and an engine flow path; and
        a first electrostatic charge device disposed between the passageway air inlet and the splitter and coupled to the inner flow path section, the first electrostatic charge device electrostatically charged to a first polarity to thereby impart an electrostatic charge of a first polarity to particulate entering the passageway air inlet;
        a second electrostatic charge device disposed downstream of the first electrostatic charge device and coupled to the outer flowpath section upstream of the scavenge flow path, the second electrostatic device electrostatically charged to a second polarity that is opposite to the first polarity, whereby particulate charged to the first polarity is attracted toward the second polarity; and
        a third electrostatic charge device disposed between the passageway air inlet and the splitter and coupled to the inner flow path section, the third electrostatic device disposed downstream of, and separate from, the first electrostatic charge device and disposed upstream of, and separate from, the second electrostatic device, the third electrostatic charge device electrostatically charged to the first polarity to thereby repel particulate charged to the first polarity.

8. The system of claim 7, wherein the first electrostatic charge device comprises a screen grid disposed adjacent to, and extending at least partially across, the passageway air inlet, the screen grid comprising a plurality of conductors electrostatically charged to the first polarity.

9. The system of claim 7, wherein the first electrostatic charge device comprises a plurality of conductors electrostatically charged to the first polarity.

10. The system of claim 7, wherein the first electrostatic charge device comprises an electrically conductive plate electrostatically charged to the first polarity.

11. The system of claim 7, wherein the second electrostatic charge device comprises a plurality of conductors electrostatically charged to the second polarity.

12. The system of claim 7, wherein the second electrostatic charge device comprises an electrically conductive plate electrostatically charged to the second polarity.

13. An inlet particle separator system for an engine, comprising:
    an inner flowpath section having an outer diameter that gradually increases to a point of maximum diameter;
    an outer flowpath section surrounding at least a portion of the inner flowpath section and spaced apart therefrom to define a passageway, the inner flowpath section and the outer flowpath section are configured to define a throat section at the point of maximum diameter;

a splitter disposed downstream of the air inlet and extending into the passageway to divide the passageway into a scavenge flow path and an engine flow path;

a secondary flow passage having a secondary flow passage inlet port and a secondary flow passage outlet port, the secondary flow passage inlet port extending through the inner flowpath section and in fluid communication with the air inlet, the secondary flow passage inlet disposed downstream of the air inlet and upstream of the throat section, the secondary flow passage outlet port extending through the splitter and in fluid communication with the scavenge flow path;

a first electrostatic charge device disposed between the air inlet and the splitter, the first electrostatic charge device electrostatically charged to a first polarity to thereby impart an electrostatic charge of a first polarity to at least a portion of particulate entering the air inlet; and a second electrostatic charge device disposed within the secondary flow passage downstream of the first electrostatic charge device and electrostatically charged to a second polarity that is opposite to the first polarity, whereby particulate charged to the first polarity is attracted toward the second polarity, wherein:
the inner flowpath section and the outer flowpath section are configured such that the passageway downstream of the throat defines a separation section that includes the scavenge flow section and the engine flow path; and
the splitter extends into the separation section.

* * * * *